United States Patent Office 2,711,302
Patented June 21, 1955

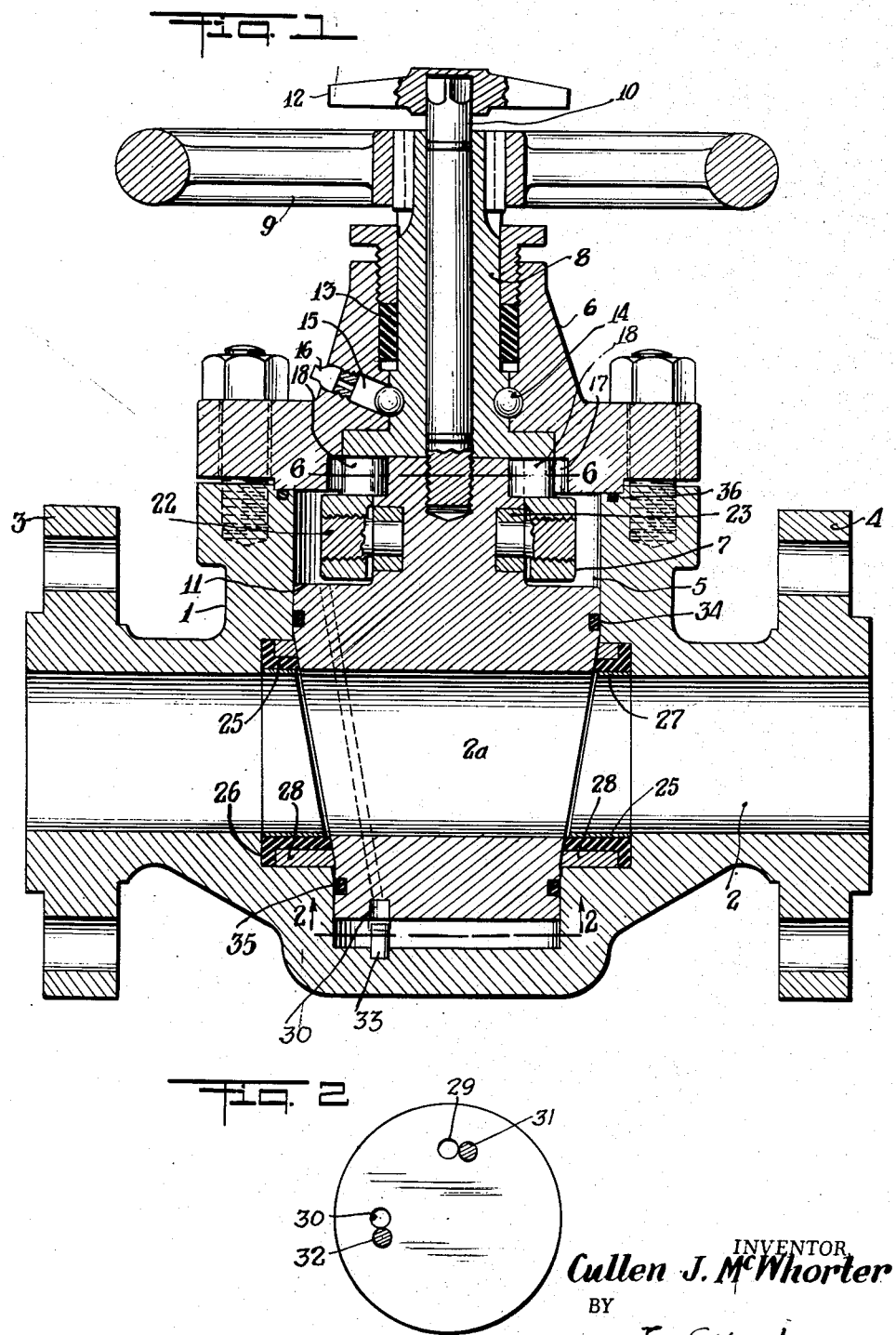

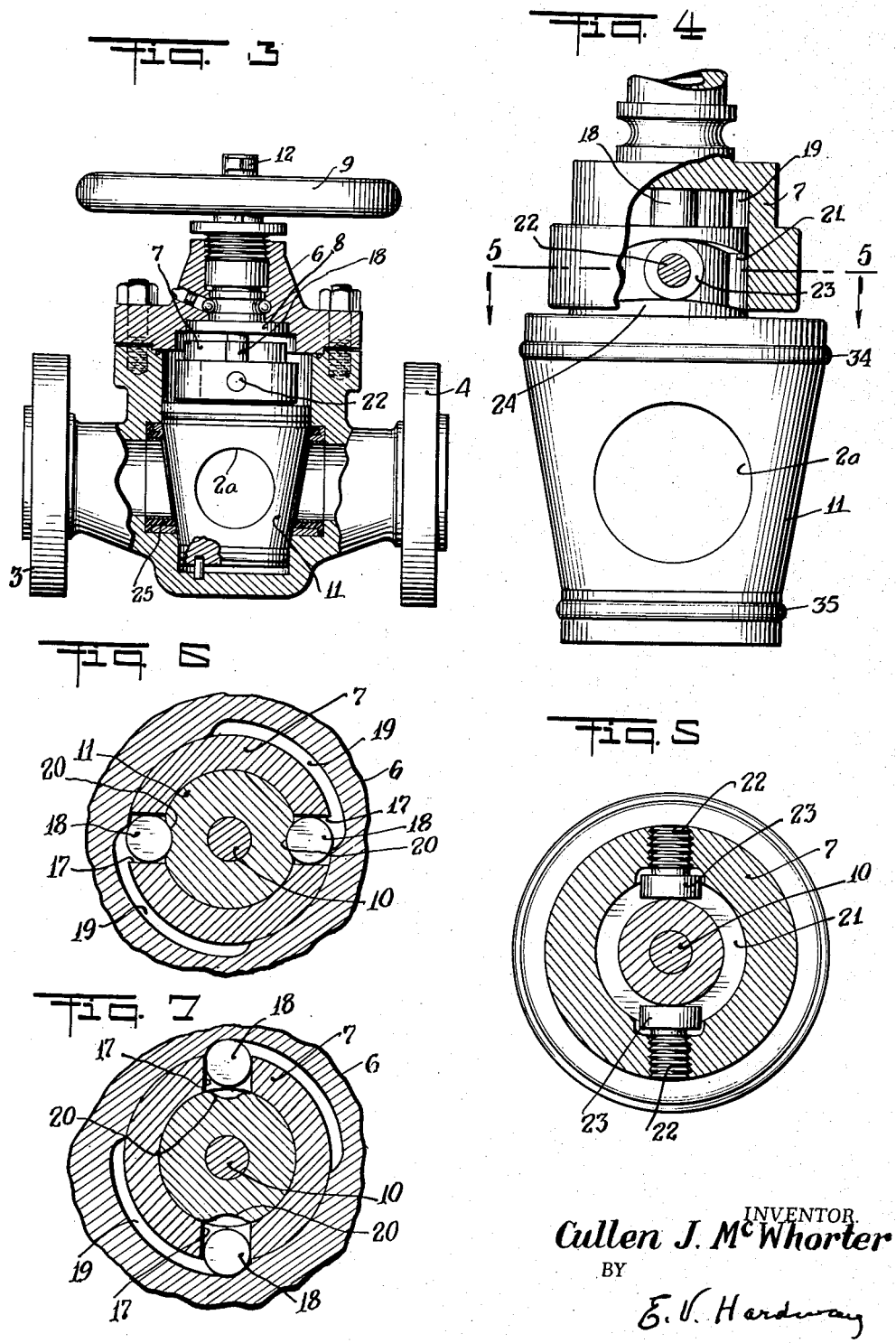

2,711,302

CONTROLLING VALVE ASSEMBLY

Cullen J. McWhorter, South Houston, Tex., assignor to South Houston Machine Company, South Houston, Tex., a corporation of Texas Application December 29, 1949, Serial No. 135,720

2 Claims. (Cl. 251—163)

This invention relates to a controlling valve assembly.

An object of the invention is to provide an assembly of the character described particularly designed for controlling the flow of fluid through pipe or similar flowways.

A more specific object of the invention is to provide means in the assembly for effectively seating the valve on its seat so as to prevent leakage when the valve is either in open or in closed position.

A further object is to provide novel means for, successively, unseating, rotating and reseating the valve in either opening or closing the valve, with co-operating means for assuring the axial alignment of the fluid passageways through the body and valve when the valve is open and the transverse alignment of said passageways when the valve is closed.

The assembly also includes a novel type of packing, or seal, around the body passageways at the upstream and downstream sides of the valve seat.

Other objects and advantages will be apparent from the following specification, which is illustrated by the accompanying drawings, wherein:

Figure 1 is a longitudinal, sectional view of the assembly shown in open position, with the valve unseated;

Figure 2 is a cross-sectional view taken on the line 2—2 of Figure 1 but omitting any showing of the valve casing and pin 33;

Figure 3 is an elevational view of the assembly, partly in section, showing the valve closed and seated;

Figure 4 is an elevational view, partly in section, of the valve and control sleeve, the latter being shown in section and in a closed, seated position;

Figure 5 is a cross-sectional view taken on the line 5—5 of Figure 4;

Figure 6 is a fragmentary, cross-sectional view taken on line 6—6 of Figure 1 with the valve open and ready to be moved into final, seated position; and Figure 7 is a fragmentary, sectional view taken on the line 6—6 of Figure 1, illustrating the parts in closed position, and ready to be moved into final, seated position.

Referring now more particularly to the drawings, the numeral 1 represents the valve body which is of a general tubular shape, having a longitudinal flowway 2 therethrough and having the end flanges 3, 4 for the connection of adjacent pipe sections to the body.

The body has a cylindrical bore 5 therein at right angles to the flowway 2 and across it. The inner end of this bore is of reduced diameter, as is shown in Figure 1, thus providing a tapering seat between the outer and inner ends of the bore.

Secured on the open end of the body there is a bonnet 6, and mounted within this bonnet there is a control sleeve 7 which is fitted into an inside recess in the bonnet and which is formed with a tubular stem 8 that extends out axially through the bonnet and has a control wheel 9 secured on the outer end thereof. This stem is tubular, and extended through it there is a shaft 10 whose inner end is secured to the adjacent end of the valve 11 and whose outer end carries an indicator 12 which indicates, to the operator, the position of said valve.

Around the outer end of the stem 8 there is a stuffing box 13, and inwardly of the stuffing box the bonnet and stem have registering grooves to receive thrust bearings 14. These thrust bearings may be inserted into place through a side opening 15 which is normally closed by means of a nipple 16 through which said bearings may be lubricated.

The sides of the control sleeve 7 have the opposing pockets 17, 17 in which there are located the escaping rollers 18, 18 which remain at all times in said pockets. These escaping rollers, as shown, are oppositely disposed, and in the inner wall of the bonnet 6 there are the opposed arcuate tracks 19, 19 which extend approximately ninety (90°) degrees around said bonnet 6 and are in alignment with the escaping rollers.

The valve 11 has opposed indentations 20, 20 to receive the escaping rollers when the valve is open, as shown in Figure 6. The upper end of the valve 11 is reduced in transverse diameter, and around this reduced end there is a groove, or track, 21, and the control sleeve 7 is of an inverted cup shape and fits over the reduced end of the valve and surrounds said groove 21, and anchored to said sleeve 7 and extending inwardly into the groove there are the spindles 22, 22. Mounted on the inner ends of these spindles and moveable along said groove, or track, 21, there are the cam wheels 23, 23. It will be noted from an inspection of Figure 4 that the upper and lower walls of the groove 21 are formed into oppositely disposed cams 24, 24 spaced one hundred eighty (180°) degrees apart.

Upon counter-clockwise rotation of the control sleeve 7, the cams 24 raise the valve. Then the escaping pins 18 reach the limit of the clearance tracks 19, 19 and are compelled to enter the indentations 20, 20 in the valve 11. The inner surface of the bonnet is then in engagement, so on further rotation of the sleeve 7 the valve 11 is rotated to the open position shown in Figure 6. During rotation of the valve there is no relative movement between valve and sleeve so the valve remains in an unseated position. A stop pin, hereinafter described, stops rotation of the valve in the open position, so further counter-clockwise rotation of the sleeve compels the escaping pins 18, 18 to again occupy the clearance tracks 19, 19, and again the cam rollers 23, 23 move along the cams 24, 24 and force the valve inwardly to a seated, open position.

As is illustrated in Figure 7, the parts there shown are in the position they will occupy when the valve is closed but unseated. In this position the valve is restrained from further rotation in a clockwise direction by a stop hereinafter described. Further rotation of the operative sleeve in a clockwise direction compels the escaping pins 18, 18 to escape the indentations 20, 20 in the valve and occupy the clearance tracks 19, 19 so that rotation of the sleeve 7 is possible. The cam rollers 23, 23 now move along the cams 24, 24 and force the valve 11 inwardly into fully seated and closed position, as shown in Figure 4.

Upon reverse rotation, control sleeve 7 will operate the valve in the reverse direction but in the same manner as hereinbefore explained, that is, the valve will first be lifted from its seat and then rotated and upon final movement will be again finally seated against the seat. This final movement, in either direction, will depend on the fit of the valve into its seat and the wear on the valve and seat. The metal rings 28 are also seal rings that are self-aligning inasmuch as slight differences in the fit are compensated for by the fact that the resilient material will yield. They also act as pistons that will extrude the resilient material into contact with the valve 30, so that both a metal to metal and metal to resilient material seal exists.

Around the passageway 2, on opposite sides of the valve, there are the seals for sealing between the valve and the seat to prevent leakage. These seals are similar but reversely arranged. Each seal comprises a packing ring 25 formed of resilient material and whose inner end is concave to conform to the external shape of the valve and whose outer end has an external, annular flange 26. Within the seals are the retainer rings 27 which are equal in length to the length of the seal, and surrounding said seals and abutting the corresponding flanges are the metal rings 28. When the valve is fully seated, the seals will be compressed and will form fluid-tight joints with the valve, and when the valve is elevated from its seat and in position to be turned or seated the expansion of these seals against the valve will retain said fluid pressure.

The inner end of the valve 11 has the bores 29, 30, ninety (90°) degrees apart, and adjacent said bores has the fixed pins 31, 32 forming stops. Upstanding from the valve bottom there is a pin 33 positioned to engage the stop 31 when the valve is in closed position and to engage the stop 32 when the valve is turned to open position to limit the turning movement of the valve, and when in either of said positions said upstanding pin will enter the bore 29 or 30, as the case may be, when the valve receives its final seating movement. When the pin 33 is engaged with either of the bores 29, 30, while the valve is in a seated position, there can be no rotation of the valve while the cam wheels 23 are moving along the cams 24, 24. This, therefore, forms a positive locking device against rotation of the valve while it is moving in a longitudinal direction.

On opposite sides of the flowway 2a the valve has annular grooves therearound to receive the packing rings 34, 35 to form seals with the body, and the upper end of the body has a groove therearound to receive a packing ring 36 to form a seal with the bonnet.

There has been shown and described what is now considered to be a preferred form of the invention, by way of illustration only and not by way of limitation, while the broad principle of the invention will be defined by the appended claims.

What I claim is:

1. A valve assembly comprising, a valve body having a flowway therethrough, a valve in the body across the flowway and having a passageway therethrough, said valve being rotatable to move said passageway into and out of alignment with the flowway, a valve seat in the body around the flowway, said valve being movable longitudinally of its axis into and out of seating engagement with said seat, a bonnet on the body and having a downwardly opening recess therein and an internal peripheral groove in the bonnet opening into said recess, a control sleeve rotatably mounted on the valve and extending into said recess, means disposed in said recess and interengageable with said sleeve and valve to cause the valve to rotate with the sleeve, said means being movable into said groove upon rotation of the sleeve to release the sleeve for rotation relative to the valve and said means being cooperable with the bonnet beyond said groove to interengage said means with the sleeve and valve, and cooperable means on said sleeve and valve operable upon rotation of said sleeve relative to the valve to move the valve longitudinally of its axis.

2. A valve assembly comprising, a valve body having a flowway therethrough, a valve in the body across the flowway and having a passageway therethrough, said valve being rotatable to move said passageway into and out of alignment with the flowway, a valve seat in the body around the flowway, said valve being movable longitudinally of its axis into and out of seating engagement with said seat, a bonnet on the body and having a downwardly opening recess therein and an internal peripheral groove opening into said recess, a control sleeve rotatably mounted on the valve and extending into said recess, said sleeve having an opening therein in lateral alignment with said recess, means movable in said opening and cooperable with the bonnet to hold said sleeve and valve against relative rotation, said means being movable to a position extending into said groove to release the sleeve for rotation relative to the valve, and cooperable means on the sleeve and valve operable upon rotation of the sleeve relative to the valve to move the valve longitudinally of its axis.

References Cited in the file of this patent

UNITED STATES PATENTS

| | | |
|---|---|---|
| 1,153,707 | Russell | Sept. 14, 1915 |
| 1,715,176 | Stevens | May 28, 1929 |
| 1,841,050 | O'Stroske | Jan. 12, 1932 |
| 1,989,009 | Heggem | Jan. 22, 1935 |
| 2,412,529 | Mueller | Dec. 10, 1946 |
| 2,443,995 | Snyder | June 22, 1948 |
| 2,464,123 | Downing et al. | Mar. 8, 1949 |
| 2,510,494 | Bowan et al. | June 6, 1950 |